United States Patent
Wernholm et al.

(10) Patent No.: US 6,692,551 B2
(45) Date of Patent: Feb. 17, 2004

(54) AIR CLEANER ASSEMBLY AND PROCESS

(75) Inventors: Lee S. Wernholm, Burton, MI (US); Paul C. Hunault, Gaines, MI (US); Corrado F. Biazzo, Grand Blanc, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/197,931

(22) Filed: Jul. 17, 2002

(65) Prior Publication Data

US 2004/0011197 A1 Jan. 22, 2004

(51) Int. Cl.$^7$ .......................... B01D 53/04; F02M 25/08
(52) U.S. Cl. .......................... 95/146; 96/134; 96/147; 96/422; 55/385.3; 55/496; 55/507; 55/508; 123/518
(58) Field of Search ................. 55/385.3, 490, 55/495, 496, 502, 505, 507, 508; 95/143, 146; 96/134, 147, 154, 422; 73/118.2; 423/210; 123/198 E, 518

(56) References Cited

U.S. PATENT DOCUMENTS

| | | | | |
|---|---|---|---|---|
| 3,006,346 A | | 10/1961 | Golding | 131/10 |
| 3,347,026 A | * | 10/1967 | Zankey | 96/136 |
| 3,368,326 A | | 2/1968 | Hervert | 55/161 |
| 3,477,210 A | | 11/1969 | Hervert | 55/387 |
| 3,541,765 A | | 11/1970 | Adler et al. | 55/316 |
| 3,572,013 A | | 3/1971 | Hansen | 55/316 |
| 3,572,014 A | | 3/1971 | Hansen | 55/316 |
| 3,681,898 A | | 8/1972 | Hopkins et al. | 55/487 |
| 3,727,597 A | | 4/1973 | Hensler | 123/136 |
| 3,747,303 A | | 7/1973 | Jordan | 55/318 |
| 3,748,829 A | * | 7/1973 | Joyce et al. | 95/146 |
| 3,849,093 A | | 11/1974 | Konishi et al. | 55/316 |
| 3,925,248 A | | 12/1975 | Moroni et al. | 252/428 |

(List continued on next page.)

FOREIGN PATENT DOCUMENTS

| | | |
|---|---|---|
| EP | 0 955 459 A2 | 4/1999 |
| GB | 2 204 810 A | 11/1988 |
| GB | 2 238 731 A | 6/1991 |
| WO | WO 01/12973 A1 | 2/2001 |

OTHER PUBLICATIONS

Author Unknown "Bi–Directional Air Meter" Delphi Automotive Systems Energy and Management Systems; Copyright 1999.

Author Unknown "Energy and Engine Management Systems" Delphi Automotive Systems, Copyright 1998.

Chase, Victor "In goes the bad air, out comes the good", Research and Development (Barrington, Illinois) v37, n9, Aug. 1995 (abstract only).

Heck et al., "PremAir catalyst system–OBD concepts" SAE 2001 World Congress, Detroit, Michigan, USA, Publication Date: Mar. 5, 2001 (abstract only).

(List continued on next page.)

*Primary Examiner*—Frank M. Lawrence
(74) *Attorney, Agent, or Firm*—Jimmy L. Funke

(57) ABSTRACT

An air cleaner assembly for an internal combustion engine and process for eliminating fuel emissions from passing into the atmosphere. The air cleaner assembly includes a housing including a filter element situated therein, an outlet for allowing filtered air to flow to the engine, and an inlet conduit extending from the housing for permitting the entry of air into the housing. A retainer is coupled to the inlet conduit. The retainer includes an adsorber member.

17 Claims, 2 Drawing Sheets

U.S. PATENT DOCUMENTS

| | | | |
|---|---|---|---|
| 4,259,096 A | 3/1981 | Nakamura et al. | 55/316 |
| 4,261,717 A | 4/1981 | Belore et al. | 55/419 |
| 4,279,630 A | 7/1981 | Nakamura et al. | 55/316 |
| 4,381,929 A | 5/1983 | Mizuno et al. | 55/316 |
| 4,418,662 A | 12/1983 | Engler et al. | 123/198 |
| 4,684,381 A | 8/1987 | Wasylyniuk | 55/316 |
| 5,226,937 A | 7/1993 | Linnersten et al. | 55/274 |
| 5,423,903 A | 6/1995 | Schmitz et al. | 96/134 |
| 5,871,569 A | 2/1999 | Oehler et al. | 96/153 |
| 5,878,729 A | 3/1999 | Covert et al. | |
| 5,892,146 A | 4/1999 | Kobayashi et al. | |
| 5,912,368 A | 6/1999 | Satarino et al. | |
| 6,152,996 A * | 11/2000 | Linnersten et al. | 96/135 |
| 6,178,939 B1 | 1/2001 | Powell | |
| 6,214,303 B1 | 4/2001 | Hoke et al. | |
| 6,279,394 B1 | 8/2001 | Svoboda et al. | |
| 6,309,451 B1 | 10/2001 | Chen | 96/134 |
| 6,383,268 B2 | 5/2002 | Oda | 96/134 |
| 6,440,200 B1 | 8/2002 | Sakakibara et al. | 96/134 |
| 6,464,761 B1 | 10/2002 | Bugli | 96/135 |
| 6,592,655 B2 * | 7/2003 | Iriyama et al. | 96/138 |
| 2002/0043156 A1 | 4/2002 | Shea | 96/134 |
| 2002/0059920 A1 | 5/2002 | Yoshioka et al. | 123/518 |
| 2002/0124733 A1 | 9/2002 | Iriyama et al. | 96/134 |
| 2002/0129711 A1 | 9/2002 | Oda et al. | 96/134 |
| 2003/0056770 A1 | 3/2003 | Honda et al. | 123/516 |
| 2003/0066427 A1 | 4/2003 | Ishida | 96/135 |

OTHER PUBLICATIONS

Petersson et al. "PremAir catalyst system–Long–term, on–road aging results" SAE International fall fuels and lubricants meeting and exposition Baltimore, MD, USA Publication Date: Oct. 1, 2000 (abstract only).

Hoke et al. "PremAir catalyst system–A new approach to cleaning the air" International fall fuels and lubricants meeting and exposition Toronto, Ontario, Canada Publication Date: Oct. 1, 1999 (abstract only).

Augsburger et al. "FTIR and Mossabauer investigation of a substituted palygorskite: Silicate with a channel structure" Journal of Physics and Chemistry of Solids, 59(2) 175–180 Feb. 1998 (abstract only).

Unknown "Sepiolite and Palygorskite" U.S. Geological Survey Open–File Report 01–041, A Labratory Manual for X–Ray Powder Diffraction, Maintained by Eastern Publications Group.

Wang et al. "The sepiolite membrane for ultrafiltration" Journal of Membrane Science, 184 (2): 153–163 Mar. 30, 2001 (abstract only).

Zhang, Gaoke "Development of sepiolite type filter tips of cigarette" Journal Wuhan University of Technology, Materials Science Edition, v15, n2, Jun. 2000 Wuhun University of Technology, Wuhan, China, p49–52 (abstract only).

Ruiz–Hitzky "Molecular access to intracrystalline tunnels of sepiolite" Journal of Materials Chemistry, 11 (1); 86–91 2001 (abstract only).

Goktas et al. "Sintering behaviour of sepiolite" Cermaics International, v23, n 4, 1997 Elsevier Science Ltd., Oxford, England, p 305–311 (abstract only).

Balci "Themal decomposition of sepiolite and variations in pore structure with and without acid pre–treatment" Journal of Chemical Technology and Biotechnology, v66, n1, pp. 72–78, May 1996, John Wiley and Sons, Ltd. (abstract only).

Bernal et al. "Natural zeolites and sepiolite as ammonium and ammonia adsorbent materials" Bioresource Technology: Biomass, Bioenergy, Biowastes, Conversion Technologies, Biotransformation, Production Technologies, v 43, n1, 1993, p 27–33.

Fujita et al. "Formation of 'Na–sepiolite' fibers by hydrothermal treatment of Na–fluor–taeniolite and Na–fluor–tetra–silicic mica" Journal of Ceramic Society of Japan, International Edition, v 101, n 5, May 1993, p 587–590 (abstract only).

Balci "Effect of heating and acid pre–treatment on pore size distribution of sepiolite" Clay Minerals, v 34, n4, 1999 Mieralogical Soc of Great Britain, London, England p 647–655 (abstract only).

Watanabe et al. "Calcined sepiolite–supported Pt/Fe catalyst" Applied Clay Science, v16, n1–2, Jan. 2000, Elsevier Science, Publishers B.V., Amsterdam, Netherlands, p 59–71 (abstract only).

Anderson et al. "Precursor–support interactions in the preparation of sepiolite–supported Ni and Pd catalysts" Clay Minerals, v 34, n1, 1999 Mineralogical Soc of Great Britain, London, England p 57–66 (abstract only).

Anderson et al. "Ni/sepiolite hydrogenation catalysts Part 1: Precursor–support interaction and nature of exposed metal surfaces" Spectrochimica Acta Part A–Molecular and Biomolecular Spectroscopy, 53 (14): 2627–2639 Dec. 1997.

Aramendia et al. "Characterization of the structure and catalytic activity of Pt/sepiolite catalysts" Journal of Colloid and Interface Science, 227 (2): 469–475 Jul. 15, 2000 (abstract only).

Aramendia et al. "Transformation of cyclohexene on palladium catalysts: activity and deactivation" Journal of Molecular Catalysis A–Chemical, 151 (1–2): 261–269 Feb. 15, 2000 (abstract only).

de la Fuente et al. "Isomerization of lactose catalyzed by alkaline–substituted sepiolites" Food Chemistry, 66 (3); 301–306 Aug. 1999 (abstract only).

Brigatti et al. "Behaviour of sepiolite in Co2+Cu2+ and Cd2+ removal from a simulated pollutant solution" Annali Di Chimica, 88 (7–8): 461–470 Jul.–Aug. 1998 (abstract only).

d'Espinose et al. "Aluminum modified sepiolite as catalyst or catalyst support" Preprints–Division of Petroleum Chemistry, American Chemical Society, Symposium on Catalyst Support; Chemistry, Forming and Characterization, Aug. 25–30, 1991, New York, NY, USA (abstract only).

Suyama et al. "Synthesis and properties of FA–zeolite–sepiolite composite adsorbent" Journal of the Ceramic Society of Japan, 109 (2): 155–161 Feb. 2001 (abstract only).

Song–jun et al. "Modification of sepiolite and its application in catalysis" Institute of Applied Chemistry of Nanchang, University, Nanchang 330047, Jiangxi, China (abstract only).

Author Unknown—"Sepiolite 3080i" Material Data Sheet Nov. 10, 1999 ITC, Inc. Hunt Valley, Maryland 21030.

Author Unknown—NSX 1991–1992 Acura Parts Catalog Second Edition 1992 "Air Cleaner" www.nsxsc.com/nsx-parts.

ACDelco Know Your Vehicle—"The Engine, an ACDelco Vehicle Operations and Maintenance" www.weekendmechanicsclub.com/ACDelco/vobeng1.htm.

Author Unknown "The Phyllosilicate Subclass (The Sheet Structures) A subclass of the Sililcates" Copyright 1998 Amethyst Galleries www.mineral.gallaries.com.

Author Unknown "For Good Measure: Delphi's New Air Meters" www.delphiauto.com/news/solutions/monthly/ms6068–11012001.

Mark H. Svoboda "Comparison of Air Meter Interface Strategies for Engine Management Systems" SAE Technical Papers, SAE 2000 World Congress, Detriot, Michigan, Mar. 6–9 2000.

Author Unknown "Modular Air Meters" Delphi Automotive.

Author Unknown "Integrated Air/Fuel Modules—Metal Manifold" Delphi Automotive.

Author Unknown—Filter Description Page—"Dust Trap/Activated Carbon Filters" www.afinc.com/descr.htm.

Author Unknown—Dust Trap Page—"More Than a Filter—The original Dust Trap, activa ted carbon absorber for furnaces and central air conditioners." www.afinc.com/dustral.html.

K. D. Henning and S. Schafer "Impregnated Activated Carbon for Environmental Protection" www.activated–carbon.com/enviro.html.

* cited by examiner

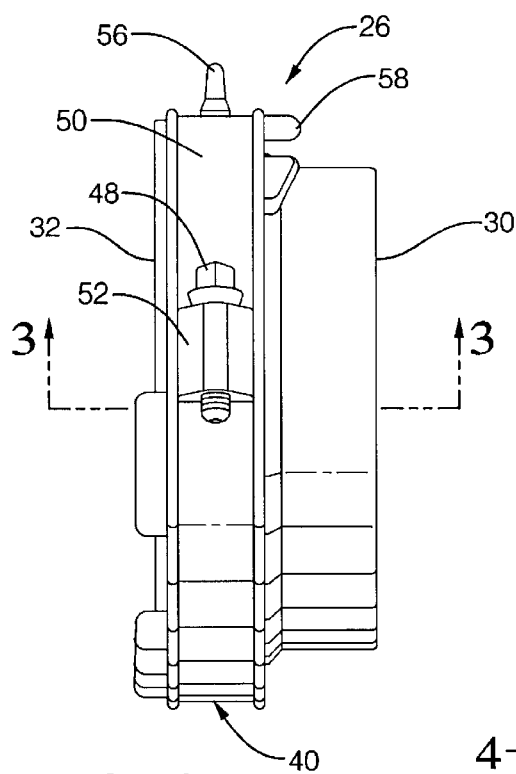
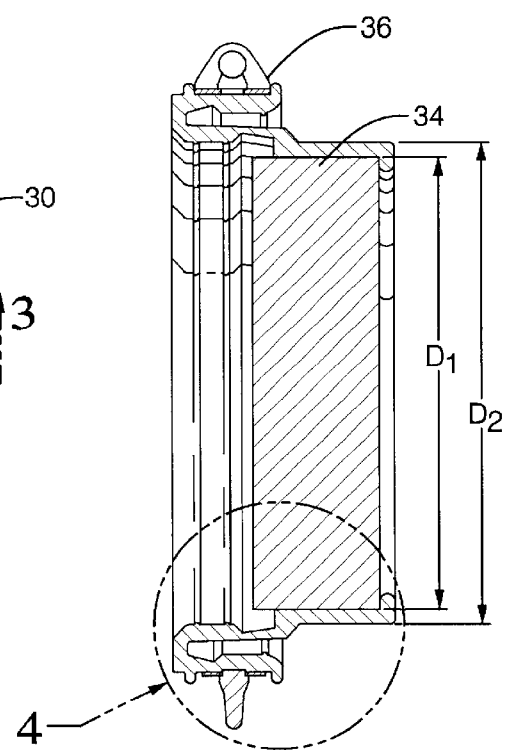
FIG. 2
FIG. 3
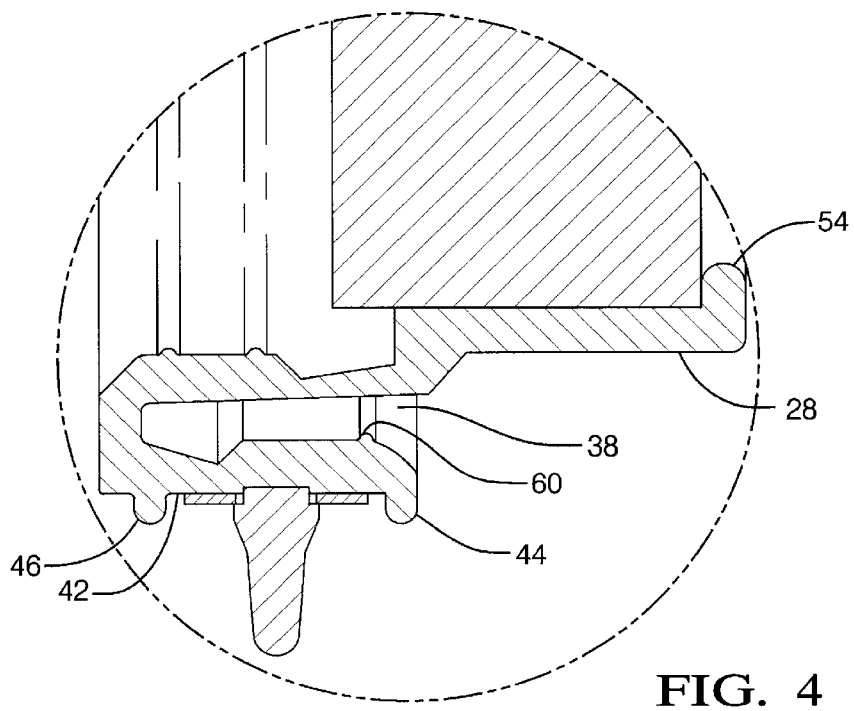
FIG. 4

AIR CLEANER ASSEMBLY AND PROCESS

BACKGROUND

As internal combustion engines wear, the annular spaces between the pistons and the cylinder tend to increase. In the combustion chamber of each cylinder, an air-fuel mixture is ignited. The expanding gas mixture forces the piston upwards generating power from the engine. In the expansion process, part of the gas mixture is forced between the annular spaces between the piston and the cylinder into the crankcase. In addition, unburned fuel can be present after the internal combustion engine is shut down. These "blow-by" gases, which also include oil mist and unburned fuel, accumulate in the crankcase and must be vented from the crankcase to the atmosphere to prevent a potentially dangerous pressure build-up in the crankcase.

Pollution control laws and regulations restrict the emissions from internal combustion engines. As exhaust gases from internal combustion engines have become cleaner, the blow-by gases have become a more significant fraction of the total pollution generated from internal combustion engines. In many localities, the pollution control laws and regulations are such that vapors from the internal combustion engines must be cleaned prior to discharge into the atmosphere.

SUMMARY

Disclosed herein is an air cleaner assembly for an internal combustion engine. The air cleaner assembly comprises a housing comprising a filter element situated therein, an outlet for allowing filtered air to flow to the engine, and an inlet conduit extending from the housing for permitting the entry of air into the housing; a retainer coupled to the inlet conduit, the retainer comprising a wall defining a first open end and a second open end, wherein the wall forms a cuffed portion about the second open end and has an annular recess facing the first open end for receiving an annular wall of the inlet conduit; a clamping device disposed about the second open end and a portion of the inlet conduit; and a hydrocarbon adsorber member sealingly disposed within the first open end.

A process for reducing fuel emissions contained within an air cleaner assembly to an external atmosphere comprises securing a retainer to an inlet conduit of an air cleaner assembly, the retainer comprising a wall defining first and second open ends, wherein the wall has a cuffed portion about the second open end forming a recess facing the first open end, and wherein a portion of the inlet conduit is seated in the recess; sealingly engaging a hydrocarbon adsorber member in the first open end; securing a clamping device about the second open end of the retainer and the portion of the inlet conduit seated in the recess to form an air tight seal between the retainer and inlet conduit.

A process for operating an air cleaner assembly comprises operating an engine in fluid communication within the air cleaner assembly for drawing air from an external environment through the air cleaner assembly to the engine, wherein the air cleaner assembly comprises a housing containing a filter element, an inlet conduit extending from the housing and an outlet; a retainer coupled to the inlet conduit, the retainer comprising a wall defining a first open end and a second open end, wherein the wall has a cuffed portion about the second open end forming a recess facing the first open end, wherein a portion of the inlet conduit is seated in the recess; and an adsorber member disposed within the first open end, wherein the adsorber member comprises an outer perimeter sealingly abutting against the retainer wall; and treating a backflow of fluid from the engine into the air cleaner assembly with the adsorber member after shutdown of the engine to reduce fuel emissions into the external environment.

The above-described and other features will be appreciated and understood by those skilled in the art from the following detailed description, drawings, and appended claims.

BRIEF DESCRIPTION OF THE DRAWINGS

Referring now to the figures wherein the like elements are numbered alike:

FIG. 2 is a perspective view of a retainer for use in the air cleaner assembly;

FIG. 3 is a cross-sectional view of the retainer of FIG. 2 taken along lines 3—3; and FIG. 4 is a magnified view of section "4" of the retainer shown in FIG. 3.

DESCRIPTION OF THE PREFERRED EMBODIMENT

Figure 1:
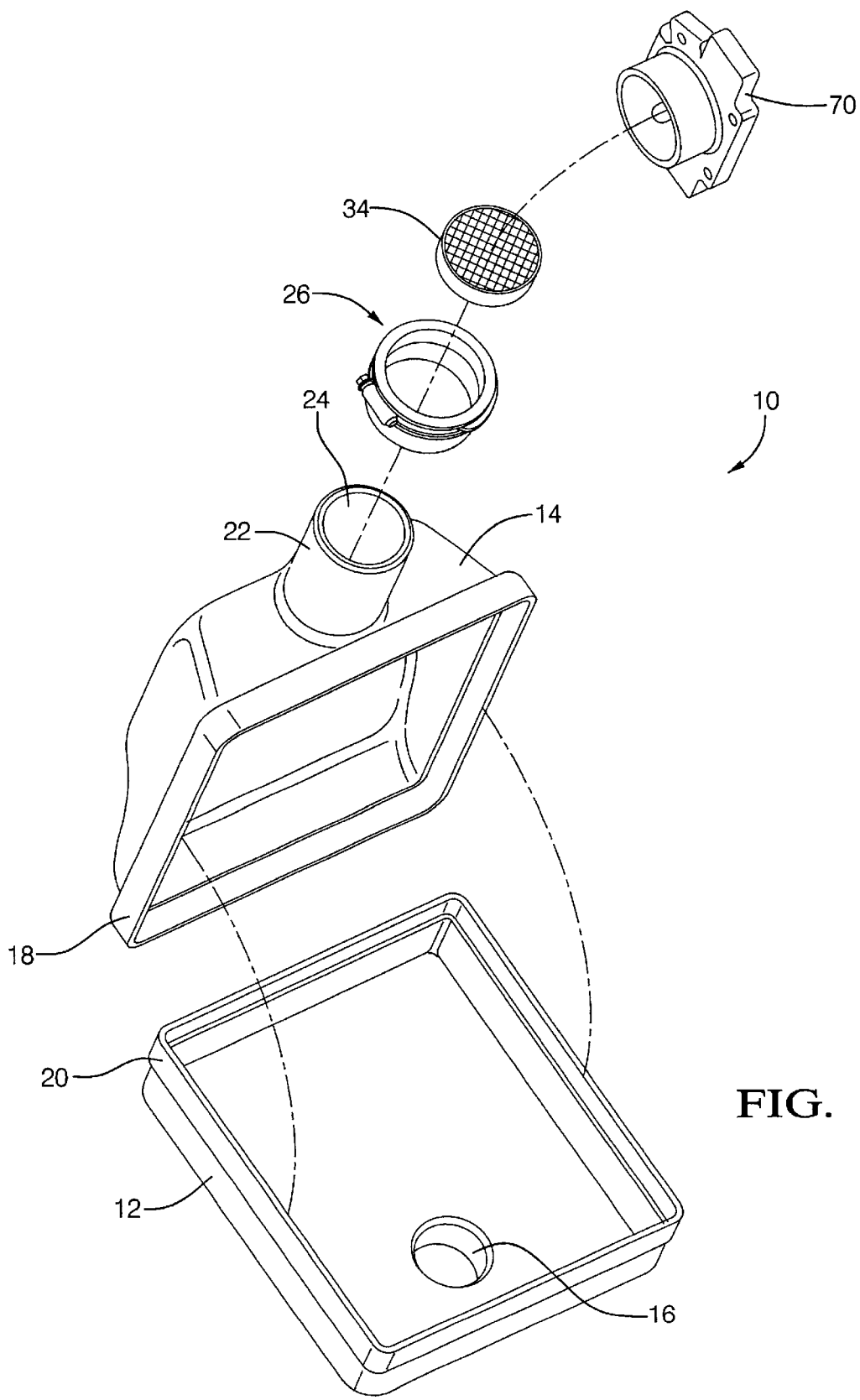
FIG. 1 is an exploded perspective view of an air cleaner assembly.

The present disclosure relates to an air induction system and process for eliminating fuel emissions. More particularly, the present disclosure relates to an air induction system and process for eliminating fuel emissions from an air cleaner assembly, for example, eliminating fuel emissions that accumulate in the air cleaner assembly after shutdown of an internal combustion engine.

Referring now to FIG. 1, there is shown an exploded perspective view of an air cleaner assembly 10. The illustrated shapes of the various components that form the air cleaner assembly are exemplary only and can be any general shape desired. The air cleaner assembly 10 generally comprises a lower case 12 and an upper case 14 that houses one or more filter elements (not shown) for removing particulate matter from an air stream during operation of the internal combustion engine. The lower and upper cases, 12 and 14 respectively, are preferably injection molded from a synthetic resin. The lower case 12 is shown with a cup-like shape and includes an outlet opening 16 in fluid communication with an engine combustion chamber or chambers through a carburetor or intake manifold. The upper case 14 of the air cleaner assembly 10 has an inverted cup-like shape that includes an outer peripheral rim 18. As previously discussed, the upper and lower cases can be a shape other than that shown, e.g., circular, rectangular, oblong, crescent, and the like. The rim 18 formed in the upper case 14 is adapted to be clamped or otherwise secured to a complementary rim structure 20 in the lower case 14. Alternatively, the upper case 14 may be secured to the lower case 12 by hinges, bolts, or other means for matingly securing the upper case 14 to the lower case 12. Preferably, the lower 12 and upper 14 cases, when secured, form a tight seal that effectively prevents entry or discharge of gases through the seal. A conduit 22 extends from the upper case 14 to provide inlet-opening 24. Preferably, the conduit 22 is cylindrically shaped having an annular wall structure. The conduit 22 is preferably integrally molded with the upper case 14. During operation, the inlet opening 24 permits the entry of air into the air cleaner assembly 10 to the engine combustion chamber or chambers.

The one or more filter elements for removing particulate matter from an air stream during operation of the internal combustion engine can have an insert or spacer construction that generally includes an outer liner and an inner liner. A media construction can be positioned between the outer liner and inner liner. A variety of materials can be utilized for the outer and inner liners including expanded metal, perforated metal and plastic liners, as examples. In general, the outer and inner liners should preferably: (a) be selected of materials appropriately perforated or otherwise made porous so as not to substantially interfere with airflow through the arrangement; and (b) be of appropriate structural rigidity and strength to contain the media construction and provide the arrangement with sufficient axial strength for the use intended and to protect the media construction from damage. Typical liners have an open area of at least 50%, often 60% or more. Galvanized metal or plastic arrangements are typically preferred. Herein the combination of the outer liner, inner liner and media construction will sometimes be referred to as the media pack. The media construction may comprise a pleated media, or alternatively, a depth media. If pleated media is used, in general, paper, fiber media, e.g., cellulose fibers, synthetic fibers and the like are preferred.

The filter element may also include first and second opposite end caps. The end caps may comprise a soft, compressible elastomer, such as foamed polyurethane; however, a harder material can be used as one or more of the end caps, with the media and liners secured to the end caps by potting material such as an adhesive, for example, a plastisol adhesive.

A retainer 26, preferably made from a resilient material, is disposed onto the conduit 22 of the upper case 14. Suitable resilient materials include rubber, and similar materials, such as rubber modified polypropylene (e.g., SANTOPRENE® from the Advanced Elastomer Systems Company). In a preferred embodiment, the retainer 26 is a single walled integral structure fabricated or molded from the resilient material.

As shown more clearly in FIGS. 2, 3, and 4, the retainer 26 generally comprises an annular wall 28 defining a first open end 30 and a second open end 32. The first open end 30 preferably has an inner diameter D1 about equal to an outer diameter of an adsorber member 34 (shown more clearly in FIGS. 1, 3) and an outer diameter D2 about equal to or less than an inner diameter of the cylindrically shaped conduit 22.

The second open end 32 comprises a cuffed portion 36 formed by annular wall 28. The cuffed portion 36 includes an annular recess 38 that is adapted to receive and accommodate a width of the annular wall defining the cylindrically shaped conduit 22. In this manner, the retainer 26 can be press fit onto the inlet conduit 22 by aligning the recess 38 of the retainer 26 with the wall defining the conduit 22, i.e., a portion of an annular wall of the inlet conduit is preferably seated in the annular recess 38. A clamping device 40, preferably a screw and threaded band type hose clamp (type F), circumscribes the outermost peripheral surface 42 of a portion of wall 28 disposed about the second open end 32. Other suitable clamping devices include those hose clamps designated as A, B, C, D, and E as defined by the Society of Automotive Engineers Standard J536b, and the like. Preferably, the outermost peripheral surface 42 of wall 28 disposed about the second open end 32 includes two spaced apart protrusions 44, 46 for accommodating and seating the band (or wire) of the clamping device 40.

As previously disclosed, the clamping device 40 preferably includes a threaded screw 48 and complementary threaded band 50 and holder 52 for adjusting the diameter of the band 50. In this manner, rotation of the screw 48 can be used to sealing compress wall 28 against the wall defining the cylindrically shaped conduit 22. The interior wall forming the recess 38 may further include one or more protrusions 60. In this case, it is preferred that the cylindrically shaped conduit 22 has a corresponding ribbed wall surface.

The retainer 26 may further include additional elements, such as a cuff attachment element, a guide element, a support element, and combinations comprising at least one of the foregoing. The additional elements may be disposed wholly or partially on the exterior and/or interior wall 28 surfaces of the retainer 26. For example, as shown in FIG. 2, cuff attachment element 56 may be disposed on the outermost peripheral surface 42 of the cuff portion 36. A guide element 58 and a support element (not shown) may also be formed in wall 31 and laterally disposed on the cuff portion 20. Additionally, although the components of the clamping device 40 may be made out of different materials, preferably they are made of materials that can withstand the temperature and chemical conditions that occur during manufacture and operation.

The adsorber member 34, also referred to as a flow regulator, is preferably press fit into the opening defined by the first open end 30 and is preferably seated against interior surfaces provided by annular wall 28 and an annular protrusion 54 that extends about an inner peripheral end of the first open end 30. The conformity of shape of the first open end 30 is preferably such as to produce an airtight seal between the adsorber member 34 and the wall 28 defining the first open end 30. As such, the adsorber member 34 can generally be any shape that conforms to the shape of the opening defined by the first open end 30. In this manner, all gases flowing into the air cleaner assembly 10 will flow through the adsorber member 34. Likewise, any gases contained within the air cleaner assembly 10 such as, for example, those fuel gases that may accumulate in the air cleaner assembly 10 after engine shutoff, will pass through the adsorber member 34 in order to enter the atmosphere.

The adsorber member 34 may comprise a substrate coated with materials including, but not limited to, pollutant treating materials, modifying agents, binders, and the like, and combinations comprising the pollutant treating material and at least one of the foregoing. The substrate can include any material designed for use in a spark ignition or diesel engine environment and which has the following characteristics: (1) capable of operating at elevated temperatures dependent upon the device's location and the type of system (e.g., gasoline or diesel); (2) capable of withstanding exposure to hydrocarbons, nitrogen oxides, carbon monoxide, particulate matter (e.g., soot and the like), carbon dioxide, and/or sulfur; and (3) have sufficient surface area and structural integrity to support a pollutant treating material, and, where desired, a catalyst. Some possible support materials include cordierite, silicon carbide, metal, metal oxides (e.g., alumina, and the like), glasses, and the like, and mixtures comprising at least one of the foregoing materials. Some ceramic materials include "Honey Ceram", commercially available from NGK-Locke, Inc, Southfield, Mich., and "Celcor", commercially available from Corning, Inc., Corning, N.Y. These materials are preferably in the form of monoliths (e.g., a honeycomb structure, and the like). Preferred monolith supports are carriers of the type having a plurality of fine, parallel gas flow passages extending therethrough from an inlet face to an outlet face of the carrier so that the passages are open to air flow entering and passing through the monolith.

Although the substrate can have any size or geometry, the size and geometry are preferably chosen to optimize surface area in the given design parameters. Preferably, the substrate has a honeycomb geometry, with the combs through-channel having any multi-sided or rounded shape, with substantially square, triangular, pentagonal, hexagonal, heptagonal, or octagonal or similar geometries preferred due to ease of manufacturing and increased surface area. Also, although each comb forming the honeycomb may be of a different size, the substrate preferably comprises a honeycomb structure wherein all combs are of about equal size. The substrate may comprise about 60 to about 600 or more fluid passageways (cells) per square inch of cross section. The thickness of the substrate may be about ⅛ inch to about 12 inches with about 0.5 to about 3 inches preferred. Preferably the passages are essentially straight from their inlet to their outlet and are defined by walls in which the pollutant treating material may be coated as a washcoat so that the gases flowing through the passages contact the pollutant treating material.

The pollutant treating material can be capable of adsorbing pollutants contained in the air surrounding the substrate. Although the types of pollutants may vary widely depending on the environmental conditions to which the adsorber member 34 is exposed, contemplated pollutants include, but are not limited to, saturated and unsaturated hydrocarbons, certain carbon oxides (e.g., carbon monoxide), nitrates, sulfides, ozone, and the like, and combinations comprising at least one of the foregoing. Such pollutants may typically comprise 0 to 400 parts per billion (ppb) ozone, 1 to 20 parts per million carbon monoxide, 2 to 3000 ppb unsaturated hydrocarbons such as $C_2$ to $C_{20}$ olefins and partially oxygenated hydrocarbons such as alcohols, aldehydes, esters, ketones, and the like. In a preferred embodiment, the pollutant treating material selectively adsorbs unsaturated hydrocarbons such as those unsaturated hydrocarbons utilized in fuels and byproducts caused by combustion.

The pollutant treating material may include adsorbers, such as silicate materials, activated carbon, activated carbons, sulfides, and the like, and combinations comprising at least one of the foregoing. Suitable silicate materials include, but are not limited to silicates belonging to the phyllosilicate class of silicates. Suitable phyllosilicates include, but are not limited to, smectites, palygorskites, sepiolites, tuperssuatsiaite, yofortierite, kalifersite, falcondoite, loughlinite, and combinations comprising at least one of the foregoing phyllosilicates, wherein smectites, palygorskites, sepiolites, and combinations comprising at least one of the foregoing phyllosilicates are preferred, and wherein sepiolites are particularly preferred. The silicate material may be either pure, i.e. 100% silicates, or it may comprise other materials, such as, but not limited to, alkaline ions including lithium, sodium, potassium, cesium, and combinations comprising at least one of the foregoing. These alkaline ion silicate materials are preferably prepared by substituting $Mg^{+2}$ ions of the silicate materials with the alkaline ions.

Suitable zeolites may include, but are not limited to Beta zeolite, dealuminated Zeolite Y, and the like, and combinations comprising at least one of the foregoing zeolites.

Pollutant treating materials may also comprise catalytic materials including metals, such as platinum, palladium, rhodium, iridium, osmium, magnesium, ruthenium, tantalum, zirconium, yttrium, cerium, nickel, copper, and the like, as well as oxides, alloys, and combinations comprising at least one of the foregoing catalytic materials, wherein nickel, palladium, and combinations comprising at least one of the foregoing is preferred.

The additional materials, which may form all or part of the coating, include oxides (e.g., alumina, zirconia, titania, and the like), aluminides, hexaaluminates, and the like, and combinations comprising at least one of the foregoing. Where an aluminide is used, preferably the aluminide comprises an aluminum in combination with at least one additional metal, such as, nickel, iron, titanium, copper, barium, strontium, calcium, silver, gold, platinum, and oxides, alloys, and combinations comprising at least one of the foregoing, with nickel, iron, titanium, and oxides, alloys, and combinations comprising at least one of the foregoing particularly preferred. Where a hexaaluminate is employed, the hexaaluminate preferably comprises a crystalline structure of aluminum and oxygen.

The coating may further comprise a binder. A preferred binder is a polymeric binder which can be a thermosetting or thermoplastic polymeric binder. The polymeric binder can have suitable stabilizers and age resistors typical in the polymeric art. The polymer can be a plastic or elastomeric polymer. Most preferred are thermosetting, elastomeric polymers.

Useful polymeric compositions include polyethylene, polypropylene, polyolefin copolymers, polyisoprene, polybutadiene, polybutadiene copolymers, chlorinated rubber, nitrile rubber, polychloroprene, ethylene-propylene-diene elastomers, polystyrene, polyacrylate, polymethacrylate, polyacrylonitrile, poly(vinyl esters), poly (vinyl halides), polyamides, cellulosic polymers, polyimides, acrylics, vinyl acrylics and styrene acrylics, poly vinyl alcohol, thermoplastic polyesters, thermosetting polyesters, poly(phenylene oxide), poly(phenylene sulfide), fluorinated polymers such as poly(tetrafluoroethylene) polyvinylidene fluoride, poly(vinylfluoride) and chloro/fluoro copolymers such as ethylene chlorotrifluoroethylene copolymer, polyamide, phenolic resins and epoxy resins, polyurethane, and silicone polymers. A most preferred polymeric material is an acrylic polymeric latex.

An alternate and useful binding material is the use of a zirconium compound. Zirconyl acetate is preferred zirconium compound used. It is believed that zirconia acts as a high temperature stabilizer, promotes catalytic activity, and improves catalyst adhesion. Upon calcination, zirconium compounds such as zirconyl acetate are converted to $ZrO_2$ which is believed to be the binding material. Various useful zirconium compounds include acetates, hydroxides, nitrates, etc. for generating $ZrO_2$ in catalysts.

A suitable application of the retainer 26 described herein is for use as an air cleaner/air meter connector ("connector"). The air meter 70 may comprise any one of numerous air meter designs and is preferably capable of measuring air mass directly before the air enters the engine, converting the measurement to a signal, and communicating the air rate information to the engine management system (EMS); such information assists a fuel-control system in calculating the amount of fuel needed for optimal combustion. The air meter 70 may be inserted into the second open end 32 and further secured by adjustment of the clamping device 40. In general, the air meter has a body comprising monocrystalline silicon upon which a membrane may be fixed. Although the air meter can be advantageously manufactured of silicon, it is not necessary to do so. A hot film anemometer circuit for airflow measure can also be implemented on the membrane. The circuit may comprise at least two heating elements, which may be in an electrical series, and arranged parallel, and proximate to each other such that at least one heating element is upstream of at least one other heating element relative to the direction of airflow across the air meter. A sensing element can also be arranged on the membrane and represents the voltage at the center tap between the heating elements. The heating elements and sensing element are preferably contacted by interconnect traces and are able to be connected through bonding pads to external operating and evaluation circuitry.

Although the heating elements, sensing elements, interconnect traces, and bonding pads are preferably formed out of a single metal layer such as platinum, it is not necessary that they all be the same material. However, the heating elements are preferably made of a material with a high temperature coefficient of resistance, such as platinum, gold, silver, or combinations comprising at least one of the foregoing to allow a temperature difference to result in a resistance differential between the two heating elements in the presence of airflow.

A passivation layer may also be deposited on the top side of the air meter. Such a passivation layer helps to prevent contaminants from interfering with the functioning of the heating elements and sensing element.

During engine operation, the air cleaner assembly 10 will draw air from the external environment through the inlet opening 24 of conduit 22 and into the housing defined by the lower and upper cases 12, 14, respectively. The air will flow through the filter elements contained within the air cleaner assembly 10 and exit the outlet opening 16 of the air cleaner assembly 10. In this manner, the air will be filtered prior to being introduced to the combustion chamber. After the engine is shutdown, fluid from the combustion chamber, e.g., air, pollutants, and the like, may backflow or diffuse into the air cleaner assembly housing 10. In order to be discharged into the atmosphere, the fluid must pass through the adsorber member 34 sealingly disposed about its outer perimeter within the retainer 24. The adsorber member 34 will selectively and advantageously adsorb the pollutants contained within the fluid, such that pollutants will not be discharged into the atmosphere. During operation of the engine, the flow of air from the external environment will help to desorb some of the previously adsorbed fluid and carry this fluid to the combustion chamber, wherein the fluid will be combusted along with the fuel.

Advantageously, the air cleaner assembly 10 reduces and preferably eliminates fuel gases from entering into the atmosphere, e.g. fuel gases that may accumulate in the air cleaner casing after engine shutdown. Hydrocarbons and other pollutants are selectively adsorbed by the adsorber member 34, thereby effectively eliminating fuel emission from the air induction system when the internal combustion engine is shut down.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. An air cleaner assembly, comprising:
    a housing comprising an inlet conduit extending from the housing and an outlet;
    a retainer coupled to the inlet conduit, the retainer comprising a wall defining a first open end and a second open end, wherein the wall has a cuffed portion about the second open end forming a recess facing the first open end, wherein a portion of the inlet conduit is seated in the recess; and
    an adsorber member disposed within the first open end, wherein the adsorber member comprises an outer perimeter sealingly abutting against the retainer wall.

2. The air cleaner assembly according to claim 1, wherein the inlet conduit is cylindrically shaped.

3. The air cleaner assembly according to claim 1, wherein the retainer comprises a single walled integral structure.

4. The air cleaner assembly according to claim 1, wherein the retainer comprises a resilient material.

5. The air cleaner assembly according to claim 1, wherein an outer diameter of the first open end is less than or equal to an inner diameter of the inlet conduit.

6. The air cleaner assembly according to claim 1, further comprising an air meter sealingly coupled to the second open end of the retainer.

7. The air cleaner assembly according to claim 1, wherein the first open end comprises an annular protrusion that extends about an inner peripheral end of the first opening.

8. The air cleaner assembly according to claim 1, wherein the cuffed portion comprises first and second annular protrusions spaced apart and disposed about an outermost peripheral surface.

9. The air cleaner assembly according to claim 1, further comprising a filter element disposed within the housing.

10. The air cleaner assembly according to claim 1, wherein the adsorber member comprises a monolith having a plurality of gas flow passages.

11. The air cleaner assembly according to claim 1, wherein the adsorber member further comprises a monolith comprising activated carbon.

12. The air cleaner assembly according to claim 1, further comprising a clamping device disposed about the second open end and the portion of the inlet conduit to provide an air tight seal between the retainer and the inlet conduit.

13. The air cleaner assembly according to claim 4, wherein the resilient material is a rubber modified polypropylene.

14. The air cleaner assembly according to claim 12, wherein the clamping device comprises a hose clamp.

15. A process for reducing fuel emissions contained within an air cleaner assembly to an external atmosphere, the process comprising:
    securing a retainer to an inlet conduit of an air cleaner assembly, the retainer comprising a wall defining first and second open ends, wherein the wall has a cuffed portion about the second open end forming a recess facing the first open end, and wherein a portion of the inlet conduit is seated in the recess;
    sealingly engaging a hydrocarbon adsorber member in the first open end;
    securing a clamping device about the second open end of the retainer and the portion of the inlet conduit seated in the recess to form an air tight seal between the retainer and inlet conduit.

16. The process according to claim 13, wherein sealingly engaging the hydrocarbon adsorber member in the first open end further comprises seating the hydrocarbon adsorber member against an annular protrusion that extends about an inner peripheral end of the wall defining the first opening.

17. A process for operating an air cleaner assembly, the process comprising:

operating an engine in fluid communication within the air cleaner assembly for drawing air from an external environment through the air cleaner assembly to the engine, wherein the air cleaner assembly comprises a housing containing a filter element, an inlet conduit extending from the housing and an outlet; a retainer coupled to the inlet conduit, the retainer comprising a wall defining a first open end and a second open end, wherein the wall has a cuffed portion about the second open end forming a recess facing the first open end, wherein a portion of the inlet conduit is seated in the recess; and an adsorber member disposed within the first open end, wherein the adsorber member comprises an outer perimeter sealingly abutting against the retainer wall; and treating a backflow of fluid from the engine to the air cleaner assembly with the adsorber member after shutdown of the engine to reduce fuel emissions into the external environment.

* * * * *